US008762883B2

(12) United States Patent
Kumar et al.

(10) Patent No.: US 8,762,883 B2
(45) Date of Patent: Jun. 24, 2014

(54) MANIPULATION OF WINDOW CONTROLS IN A POPUP WINDOW

(75) Inventors: Darshan Kumar, San Ramon, CA (US); Ambili Sudhi, Bangalore (IN); Govindraja Achar, Bangalore (IN); Pankesh Jhaveri, North Brunswick, NJ (US); Prasanth Kumar, Banagalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1146 days.

(21) Appl. No.: 12/363,385

(22) Filed: Jan. 30, 2009

(65) Prior Publication Data

US 2010/0199199 A1    Aug. 5, 2010

(51) Int. Cl.
*G06F 3/00* (2006.01)
*G06F 3/0481* (2013.01)

(52) U.S. Cl.
CPC .................................. *G06F 3/0481* (2013.01)
USPC .......................................... 715/808; 715/795

(58) Field of Classification Search
CPC ..................................................... G06F 3/0481
USPC .................................................. 715/808, 795
See application file for complete search history.

(56) References Cited

U.S. PATENT DOCUMENTS

| | | | |
|---|---|---|---|
| 6,055,507 A | 4/2000 | Cunningham | |
| 6,161,176 A | 12/2000 | Hunter et al. | |
| 6,188,401 B1 | 2/2001 | Peyer | |
| 6,229,537 B1 | 5/2001 | Sobeski et al. | |
| 6,430,591 B1 | 8/2002 | Goddard | |
| 6,453,302 B1 | 9/2002 | Johnson et al. | |
| 6,523,102 B1 | 2/2003 | Dye et al. | |
| 6,542,595 B1 | 4/2003 | Hemzal | |
| 6,624,831 B1 | 9/2003 | Shahine et al. | |
| 6,630,946 B2 * | 10/2003 | Elliott et al. | 715/781 |
| 6,636,863 B1 * | 10/2003 | Friesen | 1/1 |
| 6,683,943 B2 | 1/2004 | Wuelly | |
| 6,859,780 B1 | 2/2005 | Cunningham | |
| 6,944,829 B2 | 9/2005 | Dando et al. | |
| 6,952,681 B2 | 10/2005 | McQuade et al. | |
| 6,963,826 B2 | 11/2005 | Hanaman et al. | |
| 6,996,569 B1 | 2/2006 | Bedell et al. | |
| 7,058,890 B2 | 6/2006 | George et al. | |
| 7,107,548 B2 * | 9/2006 | Shafron | 715/826 |
| 7,179,751 B2 | 2/2007 | Smith et al. | |
| 7,219,127 B2 | 5/2007 | Huck et al. | |
| 7,222,305 B2 | 5/2007 | Teplov et al. | |
| 7,240,070 B1 | 7/2007 | Man Cheng et al. | |
| 7,243,336 B2 | 7/2007 | Brockway et al. | |

(Continued)

OTHER PUBLICATIONS

Non-Final Office Action issued Dec. 7, 2010 in U.S. Appl. No. 12/363,371.

(Continued)

*Primary Examiner* — Ryan Pitaro
(74) *Attorney, Agent, or Firm* — Miles & Stockbridge P.C.

(57) ABSTRACT

Systems and methods are provided that manipulating popup window controls. A popup window includes a presentation applet running in the popup window that collects data regarding the presentation. In order to save data collected by the applet before the popup window is closed, a control container embedded in the popup window disables the close window button of the popup window. The control container also maximizes the popup window to full screen for a more functional user interface.

17 Claims, 6 Drawing Sheets

(56) References Cited

U.S. PATENT DOCUMENTS

| | | | |
|---|---|---|---|
| 7,249,053 B2 | 7/2007 | Wohlers et al. | |
| 7,406,534 B2 | 7/2008 | Syvanne et al. | |
| 7,467,355 B1* | 12/2008 | Zukowski et al. | 715/765 |
| 7,590,939 B2 | 9/2009 | Sareen et al. | |
| 7,679,637 B1 | 3/2010 | Kohler | |
| 7,707,513 B2* | 4/2010 | Broda et al. | 715/804 |
| 7,805,334 B1 | 9/2010 | Huppert | |
| 7,827,481 B1 | 11/2010 | Greenfield et al. | |
| 7,956,869 B1* | 6/2011 | Gilra | 345/592 |
| 2001/0044731 A1 | 11/2001 | Coffman et al. | |
| 2002/0032501 A1 | 3/2002 | Tilles et al. | |
| 2002/0032582 A1 | 3/2002 | Feeney et al. | |
| 2002/0065683 A1 | 5/2002 | Pham et al. | |
| 2002/0169795 A1* | 11/2002 | Elliott et al. | 707/500 |
| 2002/0173990 A1 | 11/2002 | Marasco | |
| 2002/0188513 A1 | 12/2002 | Gil et al. | |
| 2003/0004840 A1 | 1/2003 | Gharavy | |
| 2003/0040953 A1 | 2/2003 | Kasler et al. | |
| 2003/0066032 A1* | 4/2003 | Ramachandran et al. | 715/513 |
| 2003/0088442 A1 | 5/2003 | Michael et al. | |
| 2003/0123631 A1 | 7/2003 | Moss et al. | |
| 2003/0144857 A1 | 7/2003 | Lacour et al. | |
| 2003/0158947 A1 | 8/2003 | Bloch et al. | |
| 2003/0197366 A1 | 10/2003 | Kusterbeck | |
| 2003/0226111 A1 | 12/2003 | Wirts et al. | |
| 2004/0024740 A1 | 2/2004 | McGeorge | |
| 2004/0056894 A1 | 3/2004 | Zaika et al. | |
| 2004/0113934 A1 | 6/2004 | Kleinman et al. | |
| 2004/0138965 A1 | 7/2004 | Laughlin et al. | |
| 2004/0141004 A1 | 7/2004 | Cabezas et al. | |
| 2004/0141016 A1* | 7/2004 | Fukatsu et al. | 345/856 |
| 2004/0187127 A1 | 9/2004 | Gondi et al. | |
| 2004/0205343 A1 | 10/2004 | Forth et al. | |
| 2004/0225528 A1 | 11/2004 | Brock | |
| 2004/0255232 A1 | 12/2004 | Hammond et al. | |
| 2005/0039139 A1* | 2/2005 | Schwartz et al. | 715/804 |
| 2005/0065756 A1 | 3/2005 | Hanaman et al. | |
| 2005/0102192 A1 | 5/2005 | Gerrits et al. | |
| 2005/0108044 A1 | 5/2005 | Koster | |
| 2005/0108295 A1 | 5/2005 | Karimisetty et al. | |
| 2005/0125806 A1 | 6/2005 | Bussler et al. | |
| 2006/0010397 A1* | 1/2006 | Laffey | 715/808 |
| 2006/0069785 A1* | 3/2006 | Barrett | 709/229 |
| 2006/0074775 A1 | 4/2006 | Roman et al. | |
| 2006/0085449 A1 | 4/2006 | Sattler et al. | |
| 2006/0122971 A1 | 6/2006 | Berg et al. | |
| 2006/0129432 A1 | 6/2006 | Choi et al. | |
| 2006/0136843 A1* | 6/2006 | Shafron | 715/826 |
| 2006/0190809 A1 | 8/2006 | Hejna, Jr. | |
| 2006/0247968 A1 | 11/2006 | Kadry | |
| 2006/0293930 A1 | 12/2006 | Rodgers et al. | |
| 2006/0294468 A1 | 12/2006 | Sareen et al. | |
| 2007/0016876 A1* | 1/2007 | Schultz | 715/802 |
| 2007/0186167 A1 | 8/2007 | Anderson | |
| 2007/0192192 A1 | 8/2007 | Haberman et al. | |
| 2007/0192410 A1 | 8/2007 | Liversidge et al. | |
| 2007/0203785 A1 | 8/2007 | Thompson et al. | |
| 2007/0203851 A1 | 8/2007 | Sudhi | |
| 2007/0220039 A1 | 9/2007 | Waldman et al. | |
| 2007/0226027 A1 | 9/2007 | Chang | |
| 2007/0226082 A1 | 9/2007 | Leal | |
| 2007/0283287 A1 | 12/2007 | Taylor et al. | |
| 2007/0294612 A1 | 12/2007 | Drucker et al. | |
| 2008/0075251 A1 | 3/2008 | Jefferson et al. | |
| 2008/0103821 A1 | 5/2008 | Cerbone et al. | |
| 2008/0103856 A1 | 5/2008 | Ciszkowski et al. | |
| 2008/0109286 A1 | 5/2008 | Johnson et al. | |
| 2008/0114709 A1* | 5/2008 | Dixon et al. | 706/13 |
| 2008/0126179 A1 | 5/2008 | Norfolk et al. | |
| 2008/0134077 A1 | 6/2008 | Cheng et al. | |
| 2008/0140449 A1 | 6/2008 | Hayes | |
| 2008/0172603 A1 | 7/2008 | Agarwal et al. | |
| 2008/0184157 A1 | 7/2008 | Selig | |
| 2008/0250433 A1 | 10/2008 | Orton et al. | |
| 2008/0271059 A1 | 10/2008 | Ott et al. | |
| 2008/0320509 A1 | 12/2008 | Gustafson et al. | |
| 2009/0024647 A1* | 1/2009 | Hein | 707/102 |
| 2009/0077170 A1 | 3/2009 | Milburn et al. | |
| 2009/0125850 A1* | 5/2009 | Karstens | 715/866 |
| 2009/0125907 A1 | 5/2009 | Wen et al. | |
| 2009/0172564 A1 | 7/2009 | Fish | |
| 2009/0210796 A1 | 8/2009 | Bhogal et al. | |
| 2009/0248646 A1 | 10/2009 | Probst et al. | |
| 2009/0254828 A1 | 10/2009 | Denoue et al. | |
| 2009/0265255 A1 | 10/2009 | Jackson et al. | |
| 2009/0305217 A1 | 12/2009 | Mulcahy et al. | |
| 2009/0327934 A1 | 12/2009 | Serpico et al. | |
| 2010/0037168 A1 | 2/2010 | Thayne et al. | |
| 2010/0049699 A1 | 2/2010 | Benschoter et al. | |
| 2010/0114985 A1 | 5/2010 | Chaudhary et al. | |
| 2010/0151846 A1* | 6/2010 | Vuong | 455/418 |
| 2010/0161713 A1 | 6/2010 | Gangadharappa et al. | |
| 2010/0191559 A1 | 7/2010 | Kumar et al. | |
| 2010/0191560 A1 | 7/2010 | Kumar et al. | |
| 2010/0191700 A1 | 7/2010 | Kumar et al. | |
| 2010/0192166 A1 | 7/2010 | Kumar et al. | |
| 2010/0195808 A1 | 8/2010 | Kumar et al. | |
| 2010/0198654 A1 | 8/2010 | Kumar et al. | |
| 2010/0198908 A1 | 8/2010 | Kumar et al. | |
| 2010/0199194 A1 | 8/2010 | Kumar et al. | |

OTHER PUBLICATIONS

Oracle, "Siebel Mobile Solutions," Oracle Data Sheet, pp. 1-4, 2007.
U.S. Office Action U.S. Appl. No. 12/362,406 dated Mar. 21, 2011.
U.S. Office Action U.S. Appl. No. 12/363,411 dated Mar. 31, 2011.
U.S. Office Action U.S. Appl. No. 12/363,371 dated Mar. 25, 2011.
Office Action dated Jun. 8, 2011 issued in U.S. Appl. No. 12/362,409.
Kunau, Timothy M., "Enterprise Architecture, Life Sciences, and Visualization", Oct. 4, 2006, 2 pages.
"Boehringer Inglhein Holland Experiences Significant Increase in Customer Satisfaction in 12 Months Using Siebel Pharma", Business Wire, NY p. 1, Mar. 2004.
"Business Update; CSSC Completes Siebel Systems Validations for Three Pharmaceutical Firms," Health and Medicine Week, Atlanta, p. 346, May 25, 2006.
"Demantra Introduces Demantra Suite 4.0—Software That Offers Ten Times Return on Investment by Managing Product Demand", Business Wire, NY, p. 1, Apr. 2, 2001.
"iAnywhere Prescribes Mobile Technology to Eli Lily's Italian Sales Team", PR Newswire, NY, p. 1, Mar. 22, 2004.
"Novo Nordisk Expands Siebel Pharma Deployment to Optimize European Sales Effectiveness", Business Wire, NY, p. 1, May 2003.
Oracle Licenses CIC's of eSignature Technology for Siebel Handheld for Pharma and Siebel Handheld for Service, PR Newswire, NY, Jan. 9, 2007.
Phoenix Territory Management System, incorporated by reference into Cerbone et al., U.S. Patent Application Publication No. 2008/0103821, publication date May 1, 2008.
Siebel Life Sciences Guide, Version 7.8, Rev. A Sep. 2005 pp. 1-108 http://www.erp100.com/document/SiebelNersion7.8/B31104_01/books/PDF/LSSIA.pdf.
Siebel Life Sciences Guide, Version 7.8, Rev. A Sep. 2005 pp. 109-230 http://www.erp100.com/document/SiebelNersion7.8/B31104_01/books/PDF/LSSIA.pdf.
Siebel Life Sciences Guide, Version 7.8, Rev. A Sep. 2005 pp. 231-358 http://www.erp100.com/document/SiebelNersion7.8/B31104_01/books/PDF/LSSIA.pdf.
Siebel Life Sciences Guide, Version 7.8, Rev. A Sep. 2005 pp. 359-464 http://www.erp100.com/document/SiebelNersion7.8/B31104_01/books/PDF/LSSIA.pdf.
Siebel Pharma Dynamic Sales for Pharmaceutical Biotechnology Companies, An Oracle White Paper, Customer Relationship Management and Business Analytics, Jun. 2006 http://www.oracle.com/us/industries/life-sciences/042929.pdf.
Siebel Pharma Handheld Guide, Version 7-7, Siebel Systems, Jun. 2004.
Siebel Pharma Handheld Guide, Version 7-8, May 2005 http://download.oracle.com/docs/cd/B31104_02/books/PDF/HHPharm.pdf.

(56) References Cited

OTHER PUBLICATIONS

Siebel Systems Inc., Siebel Enterprise Applications, Siebel Interactive Guide, Siebel 99, Version 5-5, 10PA1-A101-05500, Jun. 1999.
Siebel Life Sciences Guide, Version 7.7, Rev. C, Jun. 2007 pp. 1-467 http://docs.oracle.com/cd/E05553_01/books/PDF/LSSIA.pdf.
Siebel Pharma Handheld Guide, Version 7.8, May 2008, pp. 1-500 http://docs.oracle.com/cd/B31104_02/books/PDF/LSSIA.pdf.
Siebel Pharma Handheld Guide, Version 8.0, Rev. A, May 2007, pp. 1-412.
Oracle Date Sheet, "Siebel Mobile Solutions," Copyright 2007.
Oracle White Paper, "Oracle CRM for Life Sciences-Closed Loop Marketing Solution for the Pharmaceutical Sales Model," Copyright 2009.
Oracle White Paper, "Siebel Pharma Dynamic Sales Solution," Copyright 2006.
The Telemarketing Sales Rule, Published by Consumers a Helpful Guide on Sep. 1, 2005, pp. 1-2 of 2.
"Data Service Made Easy for Adobe Flex Applications," Sep. 23, 2007, http://ajax.sys-con.com/node/418939/print.
Oracle Quality Implementation Guide, Release 12, Part No. B31579-01, Dec. 2006, pp. 1-326.

\* cited by examiner

MANIPULATION OF WINDOW CONTROLS IN A POPUP WINDOW

FIELD OF THE INVENTION

One embodiment is directed to computer presentation software, and more particularly directed to the manipulation of window controls in a popup window.

BACKGROUND INFORMATION

In recent years, the annual rate of increase among physicians has remained relatively flat while the number of pharmaceutical sales representatives has grown considerably overall, even accounting for recent reductions in field force sizes. As a result, sales call effectiveness has waned in the face of a changing market and physicians' increasingly busy schedules, forcing life sciences organizations to transform their sales and marketing capabilities. Pharmaceutical companies face stiff challenges in terms of completion, cost escalation and reduction in margins, while promoting their products by sending out sales representatives to doctors, hospitals and other medical organizations. Typically the sales representatives, in the few minutes that they get with the audience/doctors, orally explain the complicated details of the medical product and then give handouts, such as presentation material on the product in paper form. A very likely result of such an approach is that after the session the audience would have already forgotten much, depending on the oral presentation skills of the representative, and the handouts most likely be thrown away. A more effective approach would be to provide the sales representative with an animated presentation that would be more engaging for the little time allotted to the presentation. During the presentation, information about the presentation could be tracked, such as how much time was spent on each segment of the presentation.

In some known presentation applications such as the Personalized Content Delivery "(PCD") feature of Oracle® Life Sciences, the presentation is displayed as an applet in a popup window, and closing that popup window will kill the applet. Because of this, any information that was tracked for the presentation must be properly saved before closing out of the applet. Otherwise, closing the window by clicking the "X" button will kill the applet without saving the information. To ensure that sales representatives save tracked information and close out of the applet properly, it would be advantageous to disable the "X" button. However, it is not known how to do disable this button in an applet-specific way. That is, the button would have to be disabled for all browser windows, which is not desirable.

SUMMARY OF THE INVENTION

One embodiment is a system for manipulating popup window controls. A popup window includes a presentation applet running in the popup window that collects data regarding the presentation. In order to save data collected by the applet before the popup window is closed, a control container embedded in the popup window disables the close window button of the popup window. The control container also maximizes the popup window to full screen for a more functional user interface.

DETAILED DESCRIPTION

Systems and methods in accordance with an embodiment allow an administrator of an enterprise application system ("EAS") to disable the "X" close button of specific applet windows. Accordingly, a user is forced to close out of the applet window properly, ensuring that information collected by the applet is recorded. An embodiment also forces a popup window to open in maximized mode where dynamic hypertext markup language ("HTML") generation does not normally allow. These features are achieved by embedding a dummy control in the popup window that can access the system menu of the popup window and allow the administrator to manipulate the window properties through the system menu.

Figure 1:
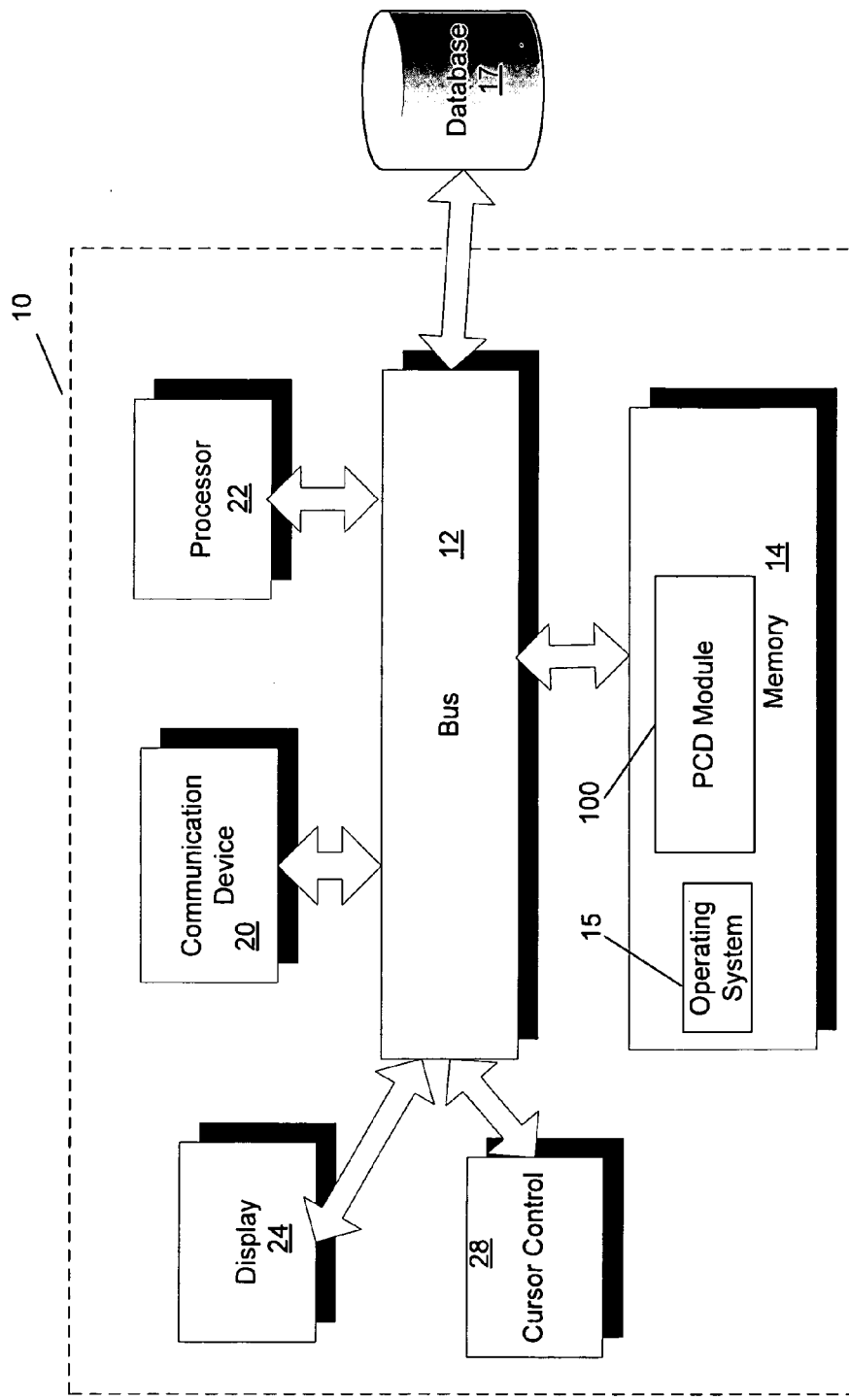
FIG. 1 is a block diagram of a system that can implement a personalized content delivery ("PCD") system in accordance with an embodiment.

FIG. 1 is a block diagram of a system 10 that can implement an embodiment of a PCD system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A cursor control device 28, such as a touch screen, is further coupled to bus 12 to enable a user to interface with system 10. In one embodiment, system 10 is a tablet PC.

In one embodiment, memory 14 stores software modules that provide functionality when executed by processor 22. The modules include an operating system 15 that provides operating system functionality for system 10. The modules further include a PCD module 100. This module is described in greater detail below. System 10 may further coupled to a database 17 for storing additional data.

Figure 2:
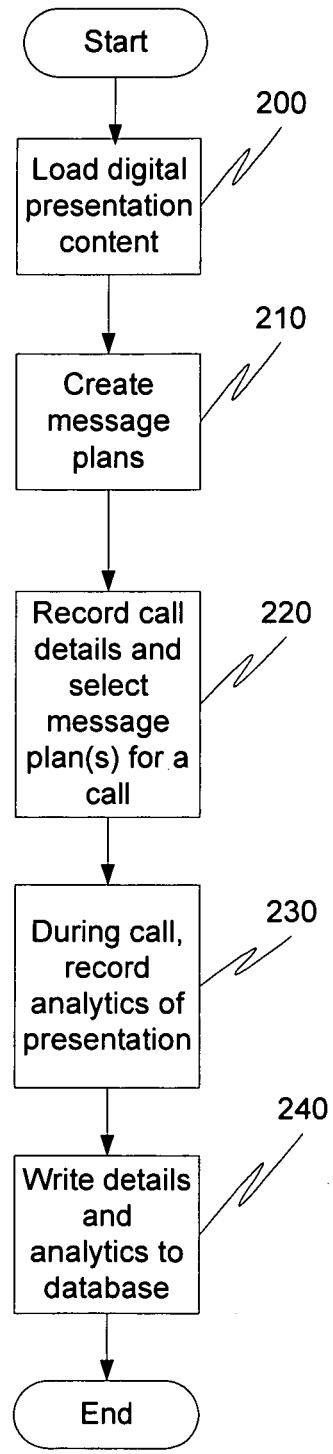
FIG. 2 illustrates a method of providing personalized content delivery and analytics in accordance with an embodiment.

FIG. 2 illustrates a flow diagram of the functionality of PCD module 100 in accordance with an embodiment. In one embodiment, the functionality of the flow diagram of FIG. 2, and FIG. 6 below, is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Initially, digital presentation content is loaded on the PCD system 10 (200). Digital presentation content may be used by brand managers, marketing managers and sales operation managers as a sales communication tool for more effective communication in order to acquire, retain and develop profitable customer relationships and improve marketing and sales effectiveness. Examples of digital presentation content includes presentations in the form of Flash files, PowerPoint files, word documents, movie files, Portable Document files, etc. A "message" refers to a slide, page or segment of a presentation conveying a specific message that managers wish to track.

After loading the digital presentation content on PCD system 10, an administrator or manager may then create a "messaging plan" for the sales representative to use (210). The messaging plan is a sequence of digital presentation content used to deliver the tracked message regarding the product. When a sales representative makes a sales call, a messaging plan is selected on PCD system 10 and details about the call are entered into the system (220). During the sales call, the PCD system 10 dynamically and automatically collects analytical data such as time spent by the sales representative on each presentation slide and the sequence of slide presentation (230). For example, PCD system 10 may include a timer (not shown) for recording the time spent on each slide or segment of the presentation.

Figure 3:
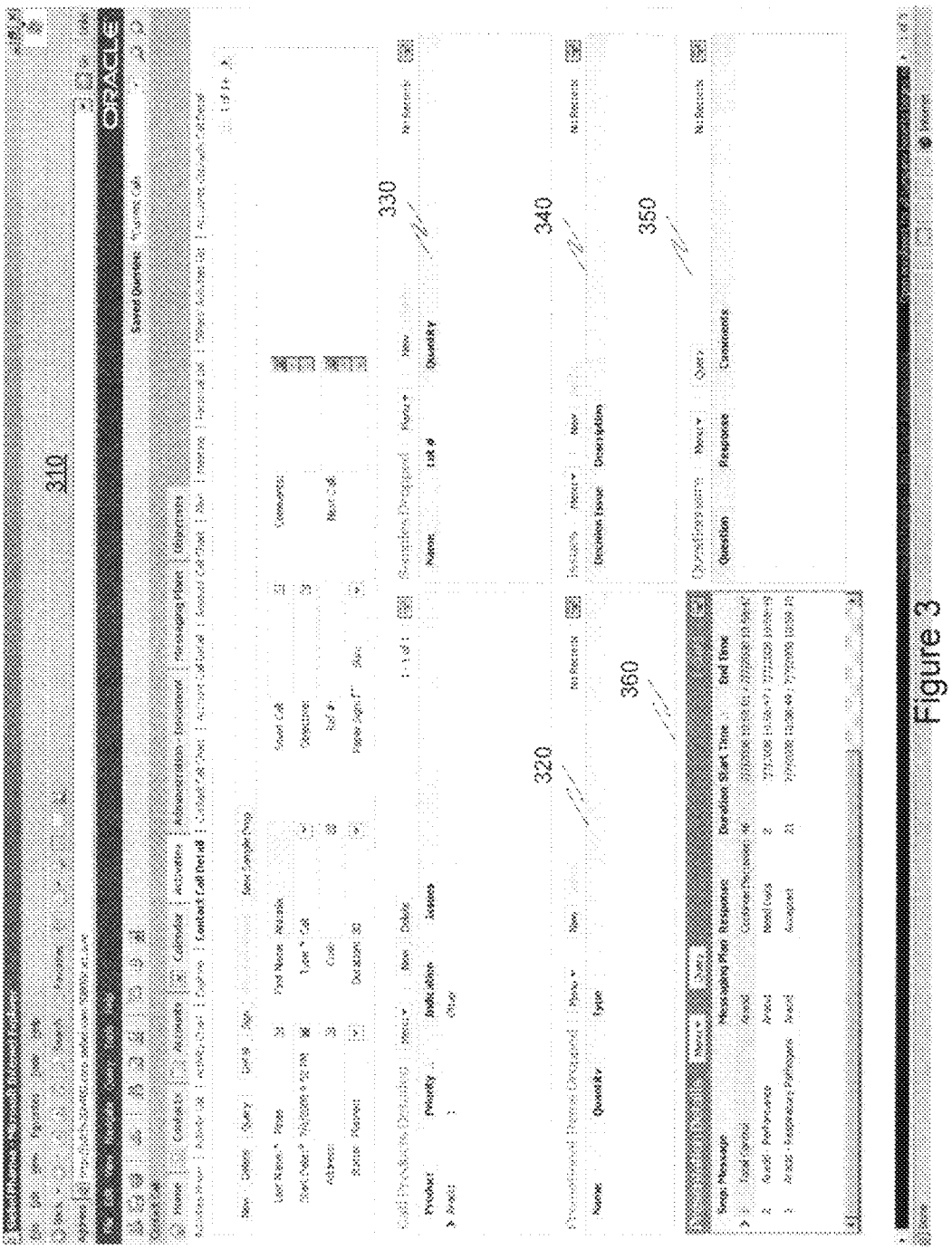
FIG. 3 illustrates example call details user interface ("UI") of the PCD system in accordance with an embodiment.

Once the sales presentation is over, the analytical data collected during the session is written back to database 17 (240). After the call, the sales representative may also enter additional details about the sales call such a samples and promotional items left with the doctor or audience, issues about the call, or questionnaires dropped during the call. FIG. 3 illustrates an example screenshot of a user interface ("UI") 310 for PCD system 10 where the sales representative can enter call details in promotional items section 320, samples dropped section 330, issues section 340, and questionnaires section 350. The screenshot UI 310 displays in presentation details section 360 the messages that were presented to the contact in the detailing session, the sequence of presented messages and their parent messaging plans (i.e., the message plan to which the messages belong), and duration of presentation of each message. Ultimately, information about the sales call and other sales calls regarding the same product may be used to develop marketing strategies for that product based on the success of the sales calls.

In one embodiment, the analytical data is written back to database 17 only if the presentation window is closed properly. That is, if the sales representative closes the presentation window using the "X" button, the application or applet (i.e., an application that runs in another application such as a web browser) running the presentation and collecting the analytical data will terminate without writing the data to database 17. Another problem is that browser popup windows (e.g., Windows Internet Explorer) typically open to a standard size. For a presentation, it is advantageous to open the presentation popup window to a full screen size (i.e., maximized). Accordingly, an embodiment embeds an ActiveX control container in the presentation popup window. When the popup window applet launches, a notification can be sent from the user interface ("UI") to the ActiveX control container to disable the "X" close window button and to maximize the popup window.

Figure 4:
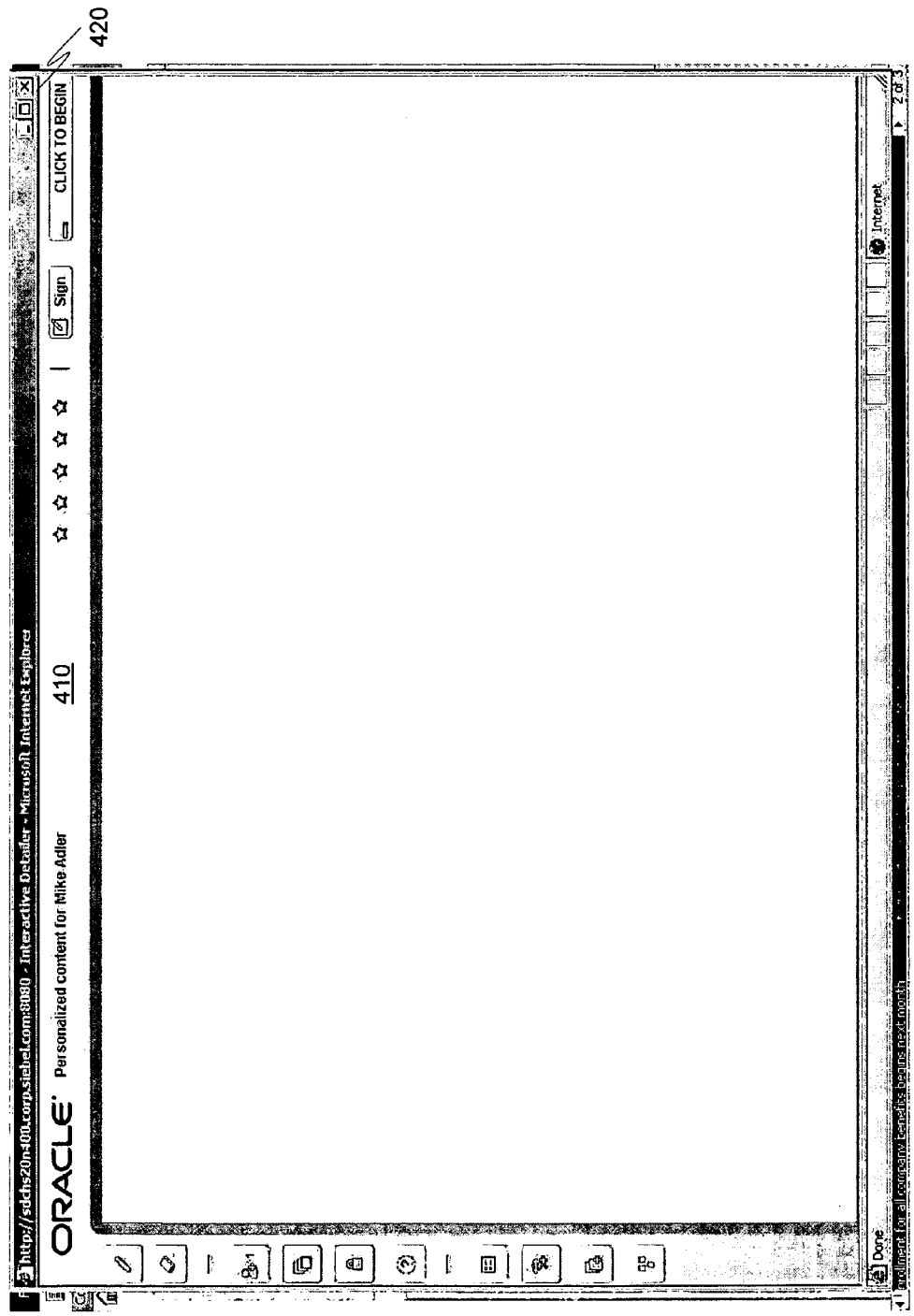
FIG. 4 illustrates an example popup window of the prior art.

FIG. 4 illustrates an example presentation popup window 410 where the "X" close window button 420 has not been disabled. Also, note that the popup window 410 has opened to less than the full screen, i.e., the popup window 410 did not open as a maximized window.

Figure 5:
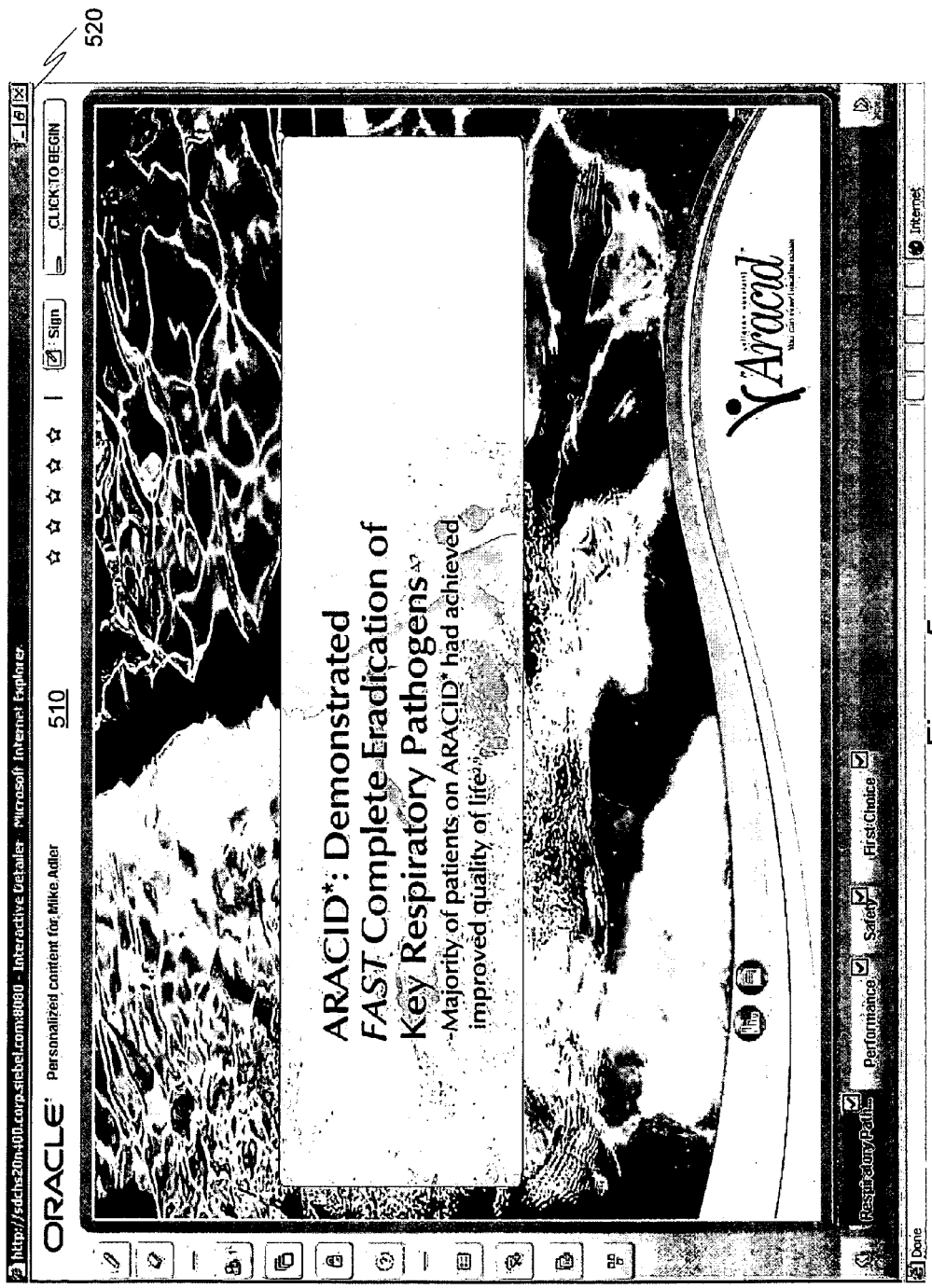
FIG. 5 illustrates an example presentation popup window where the close window control has been disabled in accordance with an embodiment.

FIG. 5 illustrates an example presentation popup window 510 where the "X" close window button 520 has been disabled in accordance with an embodiment. That is, the "X" close window button 520 is grayed out. Also, note that the popup window 510 has opened to occupy the full screen, i.e., the popup window 510 opened as a maximized window.

Figure 6:
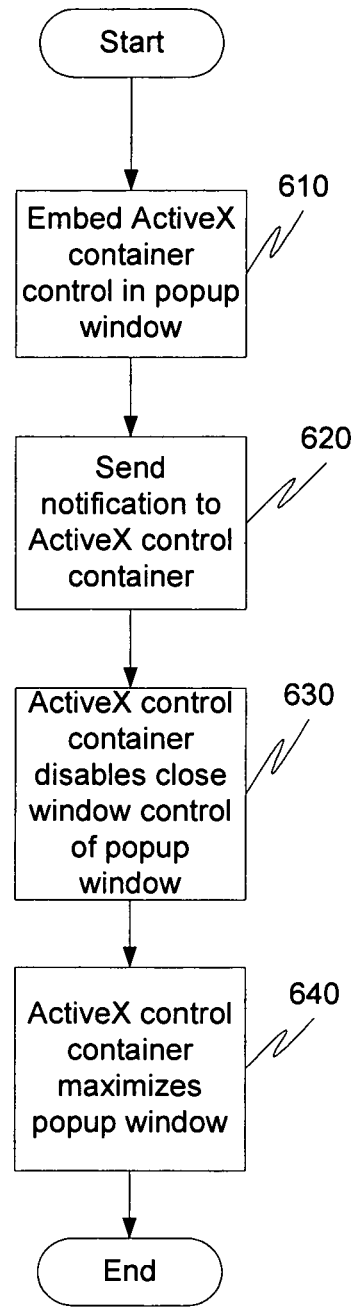
FIG. 6 illustrates a method for manipulating popup window controls in accordance with an embodiment.

FIG. 6 illustrates a method of manipulating popup window controls in accordance with an embodiment. First, an ActiveX control container is created and embedded in a popup window (e.g., popup window 510) that will host the desired applet and user interface (610). When the popup window launches and the applet loads, a notification is sent from the popup window to the ActiveX control container (620). The ActiveX control container then calls the system menu of the popup window and disables the "X" close window button (e.g., button 520) (630). The ActiveX control container also uses the system menu of the popup window to maximize the popup window (640).

Example code for an ActiveX control container in accordance with an embodiment is shown below:

```
STDMETHODIMP CSSFlexAxContainerCtrl::Notify (NotifyType nType,
ISSPropertySet* pData)
{
............................. .
if (m__bMaximizeWindow)
    {
    HWND hPopWnd = GetTopLevelParent( );
    ::GetWindowPlacement(hPopWnd, &wp);
    wp.showCmd = SW__SHOWMAXIMIZED;
    ::SetWindowPlacement(hPopWnd, &wp);
    //Setting m__bMaximizeWindow to FALSE, so that the popup will
    //not be MAXIMIZED every time the function is getting called.
    m__bMaximizeWindow = FALSE;
    //Graying out X button in popup window
        hPopWnd = GetTopLevelParent( );
        HMENU hSysMenu = ::GetSystemMenu(hPopWnd, FALSE);
        EnableMenuItem (hSysMenu, SC__CLOSE, MF__GRAYED);
    }
............................. .
```

As disclosed, systems and methods for manipulating a browser window are disclosed. Previously, system features of a browser window could not be controlled in a window-specific manner. Here, an ActiveX control container is embedded in a web browser to allow the container to be used to make calls to the system menu of the browser application. Thus, calls to the contain may control the browser window in a window-specific manner. Accordingly, the close window button of a popup window may be disabled to prevent loss of information by improperly closing the popup window. Furthermore, the maximize controls may be accessed so that popup windows may be launched in a full screen window, rather than a standard popup window size.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A method for manipulating a popup window, comprising:
loading a presentation applet within the popup window, wherein the presentation applet runs in the popup window and dynamically collects analytical data regarding a presentation that comprises one or more messages, wherein the analytical data comprises time spent on each message of the presentation, and a sequence of the one or more messages of the presentation;
receiving, by a control container embedded in the popup window, a notification to disable a close window button;
calling a system menu of the popup window; and
disabling the close window button of the popup window, wherein collected analytical data is written to a database by the applet before the popup window is closed.

2. The method of claim 1, wherein the close window button is an "X" button of a window.

3. The method of claim 1, wherein the control container is an ActiveX control container.

4. The method of claim 1, further comprising:
receiving, by the control container embedded in the popup window, a notification to maximize the popup window;
calling the system menu of the popup window; and
maximizing the popup window.

5. The method of claim 1, wherein disabling the close window button of the popup window prevents a loss of data collected by an application running in the popup window.

6. A non-transitory computer-readable medium having instructions stored thereon that, when executed by a processor, cause the processor to manipulate a popup window by:
loading a presentation applet within the popup window, wherein the presentation applet runs in the popup window and dynamically collects analytical data regarding a presentation that comprises one or more messages, wherein the analytical data comprises time spent on each message of the presentation, and a sequence of the one or more messages of the presentation;
receiving, by a control container embedded in the popup window, a notification to disable a close window button;
calling a system menu of the popup window; and
disabling the close window button of the popup window, wherein collected analytical data is written to a database by the applet before the popup window is closed.

7. The non-transitory computer-readable medium of claim 6, further comprising:
receiving, by the control container embedded in the popup window, a notification to maximize the popup window;
calling the system menu of the popup window; and
maximizing the popup window.

8. The non-transitory computer readable medium of claim 6, wherein the close window button is an "X" button of a window.

9. The non-transitory computer readable medium of claim 6, wherein the control container is an ActiveX control container.

10. The non-transitory computer readable medium of claim 6, wherein disabling the close window button of the popup window prevents a loss of data collected by an application running in the popup window.

11. A system for manipulating popup window controls, comprising:
a memory configured to store one or more software modules;
a processor configured to execute the one or more software modules;
a popup window that is created by the processor when executing the one or more software modules;
a presentation applet running in the popup window that dynamically collects analytical data regarding a presentation that comprises one or more messages, wherein the analytical data comprises time spent on each message of the presentation, and a sequence of the one or more messages of the presentation; and
a control container embedded in the popup window that disables a close window button of the popup window, where collected analytical data is written to a database by the applet before the popup window is closed.

12. The system of claim 11, wherein the control container maximizes the popup window.

13. The system of claim 11, wherein the close window button is an "X" button of a window.

14. The system of claim 11, wherein the control container is an ActiveX control container.

15. The system of claim 11, wherein the control container receives a notification to maximize the popup window, calls the system menu of the popup window, and maximizes the popup window.

16. The system of claim 11, wherein disabling the close window button of the popup window prevents a loss of data collected by an application running in the popup window.

17. A system for manipulating a popup window, comprising:
means for loading a presentation applet within the popup window, wherein the presentation applet runs in the popup window and dynamically collects analytical data regarding a presentation that comprises one or more messages, wherein the analytical data comprises time spent on each message of the presentation, and a sequence of the one or more messages of the presentation;
means for receiving, by a control container embedded in the popup window, a notification to maximize the popup window;
means for calling a system menu of the popup window; and
means for maximizing the popup window, wherein collected analytical data is written to a database by the applet before the popup window is closed.

* * * * *

UNITED STATES PATENT AND TRADEMARK OFFICE
CERTIFICATE OF CORRECTION

| | | |
|---|---|---|
| PATENT NO. | : 8,762,883 B2 | Page 1 of 1 |
| APPLICATION NO. | : 12/363385 | |
| DATED | : June 24, 2014 | |
| INVENTOR(S) | : Kumar et al. | |

It is certified that error appears in the above-identified patent and that said Letters Patent is hereby corrected as shown below:

On title page, column 1, item [75] under Inventors, line 5, delete "Banagalore" and insert -- Bangalore --, therefor.

On title page 2, column 2, References Cited under Other Publications, line 8, delete "Inglhein" and insert -- Ingelheim --, therefor.

On title page 2, column 2, References Cited under Other Publications, line 28, delete "SiebelNersion" and insert -- Siebel/Version --, therefor.

On title page 2, column 2, References Cited under Other Publications, line 31, delete "SiebelNersion" and insert -- Siebel/Version --, therefor.

On title page 2, column 2, References Cited under Other Publications, line 34, delete "SiebelNersion" and insert -- Siebel/Version --, therefor.

On title page 2, column 2, References Cited under Other Publications, line 37, delete "SiebelNersion" and insert -- Siebel/Version --, therefor.

Signed and Sealed this
Tenth Day of March, 2015

Michelle K. Lee
*Deputy Director of the United States Patent and Trademark Office*